United States Patent [19]

Policy et al.

[11] 4,236,728
[45] Dec. 2, 1980

[54] APPARATUS FOR CASTER ADJUSTMENT

[76] Inventors: Jene A. Policy, 2927 N. 39th Ave., Phoenix, Ariz. 85019; Peter A. Giuliano, 3012 W. Heatherbrae Dr., Phoenix, Ariz. 85017

[21] Appl. No.: 960,481

[22] Filed: Nov. 13, 1978

[51] Int. Cl.³ .............................................. B60P 1/00
[52] U.S. Cl. .................................................. 280/661
[58] Field of Search ...................... 280/661, 660, 96.1, 280/95 R, 90, 668

[56] References Cited

U.S. PATENT DOCUMENTS

| | | | |
|---|---|---|---|
| 2,052,257 | 8/1936 | Smith | 280/90 X |
| 2,059,974 | 11/1936 | Smith | 280/95 R |
| 2,059,975 | 11/1936 | Smith | 280/90 X |
| 2,238,879 | 4/1941 | Dauben | 280/661 X |
| 2,664,297 | 12/1953 | Booth | 280/661 |
| 3,096,994 | 7/1963 | Primean et al. | 280/661 X |
| 3,273,909 | 4/1966 | Müller et al. | 280/661 |
| 3,285,622 | 11/1966 | Castoe | 280/661 |
| 3,438,646 | 4/1969 | Hannapel | 280/96.1 |
| 3,497,233 | 2/1970 | Bolaski, Jr. | 280/661 |
| 3,498,630 | 3/1970 | Crawford | 280/661 X |
| 3,526,413 | 9/1970 | Muller | 280/661 |
| 3,751,061 | 8/1973 | Scheuerpflug | 280/661 |
| 3,819,202 | 6/1974 | Castoe | 280/661 |
| 3,826,328 | 7/1974 | Sheppard | 280/95 R X |
| 3,948,336 | 4/1976 | DeFusco et al. | 280/661 X |
| 3,999,779 | 12/1976 | Bishop | 280/661 |
| 4,026,578 | 5/1977 | Mattson | 280/668 X |
| 4,030,737 | 6/1977 | Bridger | 280/661 |
| 4,037,680 | 7/1977 | Grove | 280/661 X |
| 4,120,507 | 10/1978 | Miller | 280/95 R X |

*Primary Examiner*—John J. Love
*Assistant Examiner*—Norman L. Stack
*Attorney, Agent, or Firm*—Cahill, Sutton & Thomas

[57] ABSTRACT

Each upper control arm of a conventional automotive vehicle is automatically incrementally pivotally locatable about the vertical axis to vary the caster of an attached wheel within a predetermined range from maximum positive caster to maximum negative caster in response to an input signal generated by the driver while the vehicle is in motion.

14 Claims, 6 Drawing Figures

APPARATUS FOR CASTER ADJUSTMENT

The present invention relates to apparatus and a method for vehicular caster adjustment and, more particularly, to apparatus and a method for adjusting caster while a vehicle is in motion.

In a vehicle, caster is the tilt of the ball joints' center line forwardly or backwardly from vertical, as viewed from the side. If the ball joints' center line is tilted toward the rear of the car, caster is positive. Negative caster results if the center line of the ball joints is tilted toward the front of the vehicle.

A change in the castering angle will also have an effect on the weight distribution of the vehicle since a change in caster results in a change in the point through which the load acts (intersection of a line through the ball joints and the road surface). Thereby, the caster angle can be altered for the purpose of more effective braking.

Positive caster is usually applied in automotive design to increase stability, which is a tendency to run straight ahead. When positive caster is employed, the front wheels are actually pulled behind the point of load which receives the driving force; thus, the wheels will trail directly behind. Stated another way, the projected central line of the ball joints, which is actually the point of load, strikes the road in front of the tire contact with the road.

One disadvantage resulting from positive caster is that as the wheels are turned from a straight ahead position, the vehicle will tend to lean out of the turn. This happens because the inside wheel is forced to turn down slightly raising the inboard side of the vehicle; whereas the outboard wheel must lift slightly when turning which causes the outboard side of the vehicle to be lowered slightly. The net effect is that the vehicle is tipped away from the direction in which it is turning.

When a vehicle, such as a truck or racing vehicle, is designed to use negative caster, it must sacrifice the directional stability which positive caster provides. However, effort to steer will be reduced and the car will tend to lean into a curve rather than the slight roll out effect experienced with positive caster. Steering effort is reduced because when a caster is negtaive the pivot point or point of load will actually contact the road behind the tire contact. This reduces steering effort because momentum is no longer attempting to hold the wheels in a straight ahead position. Clinging is improved because the reverse effect of what happens with positive caster now occurs. That is, as the result of the forward tilt of the ball joint axis, the inside wheel now raises slightly as the wheel is turning and the outboard wheel moves down thus causing the vehicle to tip into the turn. This action helps counteract centrifugal force.

In summary, positive caster helps the vehicle run straight ahead but increases steering effort to turn the vehicle. Conversely, negative caster hinders a vehicle's ability to run straight ahead but reduces the effort required to turn and tends to make the car lean in on a turn, thus improving cornering.

It is readily noted that with either positive or negative caster, the designer of the vehicle gains some advantage but must also experience some disadvantage. As a result, most conventional passenger cars employ little or no caster; however heavy front end vehicles, such as trucks, may employ some negative caster to help reduce steering effort. For vehicles having a light front end, positive caster will usually by employed. The caster, whether positive or negative, has little if any effect on tire wear so long as the caster angle on both sides of the vehicle is equal.

Because of the importance of caster to the handling of a vehicle, a substantial amount of work has been done over the years to identify, maintain and adjust caster. U.S. Pat. Nos. 2,052,257, 2,059,974 and 2,059,975, disclose automatic wheel aligners which neutralize the errors arising from misalignment, including caster, so that function of the vehicle will not be impaired because of these errors. U.S. Pat. Nos. 3,597,728 and 3,438,646 describe automatic indicating mechanisms which will inform the driver of misalignment due to camber, caster or toe-in and toe-out conditions. U.S. Pat. Nos. 3,285,622, 3,273,909 and 3,356,028 are directed to various adjustment tools and devices for aligning the front wheels of a vehicle. U.S. Pat. Nos. 3,819,202 and 4,026,578 are directed to devices for setting a wheel hub assembly with respect to both caster and camber. U.S. Pat. Nos. 3,497,233, 3,999,779, 4,030,737, 4,037,680 and 4,065,144 are directed to various tools and apparatus for setting the camber of a vehicular front wheel assembly.

By inspection of the above patents, it becomes apparent that each and every mechanism, apparatus or tool described therein is intended to be used for setting caster or camber when the vehicle is not in motion. The only known United States patent which discloses apparatus for modifying the front wheel alignment of a vehicle while the vehicle is in motion is that described in U.S. Pat. No. 3,498,630. Herein, by adjusting the lengths of the arms in the steering linkage, toe-in and toe-out may be modified while the vehicle is in motion.

It is therefore a primary object of the present invention to provide apparatus for varying the caster of the front wheels of a vehicle while the vehicle is in motion.

Another object of the present invention is to provide apparatus for altering the handling characteristics of a vehicle while the vehicle is in motion.

Still another object of the present invention is to provide a driver controllable mechanism for varying the caster angle of a vehicle's front wheels while the vehicle is in motion.

Yet another object of the present invention is to provide a switch controllable power apparatus for pivoting rearwardly or forwardly the control arms of the front wheel assemblies of a vehicle while the vehicle is in motion.

A further object of the present invention is to provide a caster adjustment apparatus which includes a fail safe feature to preclude the caster angles of particular front wheel assemblies from exceeding predetermined limits.

A still further object of the present invention is to provide an automatically adjustable mechanism for varying the caster of vehicular front wheel assemblies while maintaining a set camber.

A still further object of the present invention is to provide a vehicle with a driver controlled front wheel system which may be modified to suit varying road conditions while the vehicle is in motion.

These and other objects of the present invention will become apparent to those skilled in the art as the description thereof proceeds.

The present invention may be described with greater specificity and clarity with reference to the following drawings, in which.

Figure 1:
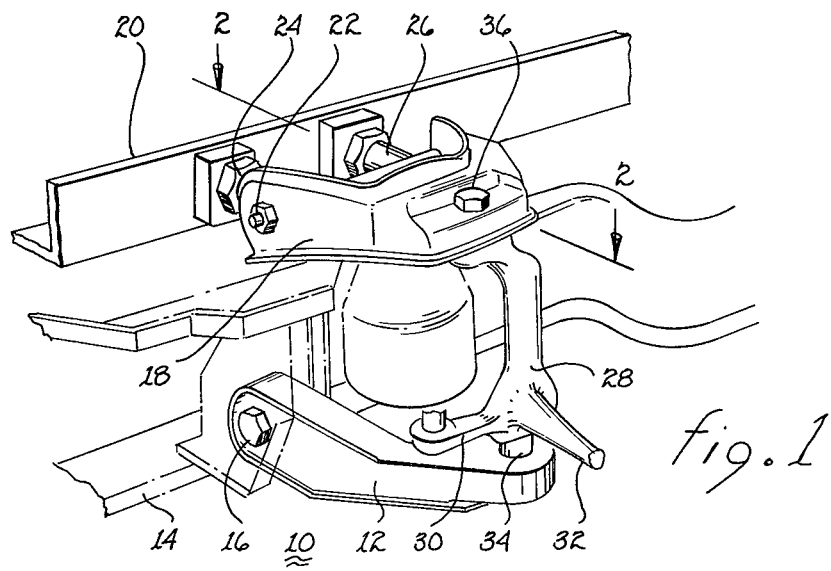
FIG. 1 is a perspective view of a front wheel assembly mated to the chassis of a vehicle.

Referring to FIG. 1, there is shown a typical and representative front wheel assembly 10 for attaching a wheel to a chassis. A lower control arm 12 is pivotally attached to frame member 14 through a pivot shaft 16. An upper control arm 18 is attached to frame member 20 through pivot shaft 22 supported by assemblies 24 and 26 extending from frame member 20. A knuckle spindle 28, supporting spindle steering arm 30 and wheel spindle 32, is attached to lower control arm 12 through lower ball joint 34 and to upper control arm 18 through upper ball joint 36.

As is well discussed in the above cited prior art, lateral movement of upper control arm 18 with respect to frame member 20 determines the camber of the wheel attached to spindle 32. Pivotal movement of upper control arm 18 about a vertical axis, brought about by bringing one end of pivot shaft 22 into a closer relationship with frame member 20 simultaneous with repositioning the other end of the pivot shaft away from the frame member, determines the angle of caster of the wheel mounted on spindle 32. Generally, pivot shaft 22 is attached to frame member 20 through engagement with two spaced apart bolts extending from the frame member; thus, the relative position of the pivot shaft with respect to each of the bolts provides a means for varying the lateral displacement and angular orientation of the upper control arm with respect to the frame member.

Figure 2:
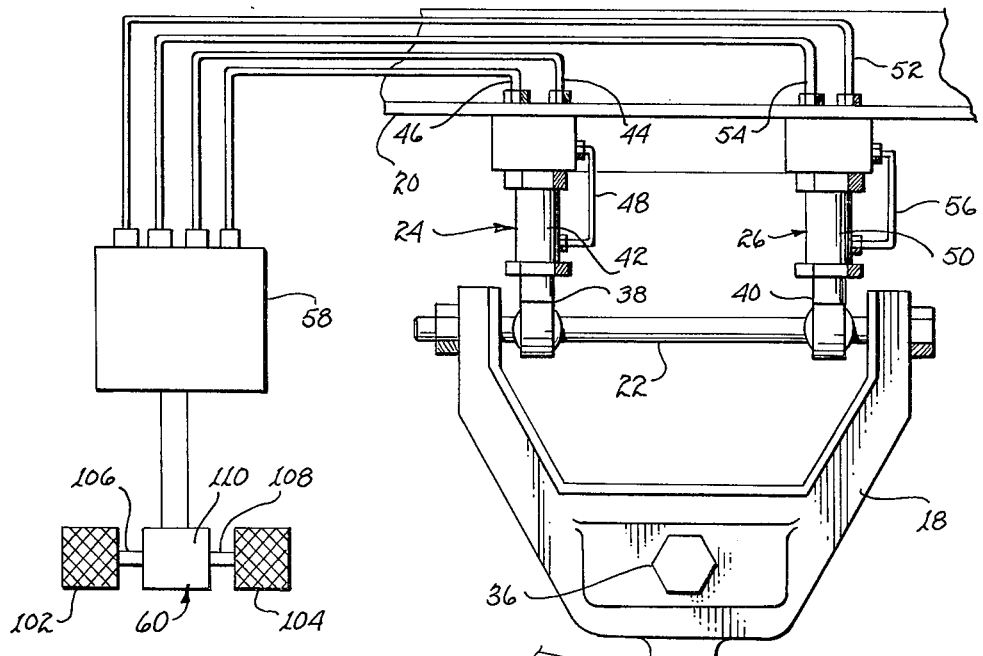
FIG. 2 is a top view of one embodiment of the present invention.

Turning now to FIG. 2, there will be described a representative system for hydraulically repositioning upper control arm 18 with respect to frame 20 in response to a driver actuated command signal. Assemblies 24 and 26 are hydraulically operated units having plungers 38 and 40 extending therefrom. Each of these plungers is pivotally attached to pivot shaft 22 such that any translational movement of one or both of the plungers results in commensurate displacement of the pivot shaft with respect to frame member 20. Plunger 38 is translatable with respect to cylinder 42 in response to a change in hydraulic pressure in hydraulic lines 44 and 46. To obtain controlled extension and retraction of plunger 38, the plunger may include a double acting piston whereby the hydraulic fluid pressure exerted by the fluid in line 46 forces extension of plunger 38 while an increase in hydraulic pressure in line 44 and conveyed through line 46 results in contraction of the plunger. Plunger 40 may be similarly constructed and operated with respect to cylinder 50 in response to changes in pressure in hydraulic lines 52, 54 and 56.

A source 58 of hydraulic fluid under pressure is in fluid communication with each of hydraulic lines 44, 46, 52 and 54. The flow of hydraulic fluid in the hydraulic lines is regulated by a control valve mechanism 60 which is accessible to the driver while driving the vehicle. In example, the control valve mechanism may be a treadle for either foot or manual operation. On depressing either of pads 102 or 104 attached arms 106 and 108 extending from junction 110 actuate directly or through control rods flow of hydraulic fluid into and out of source 58. Alternatively, the control valve mechanism may be a manually operated lever.

Figure 3:
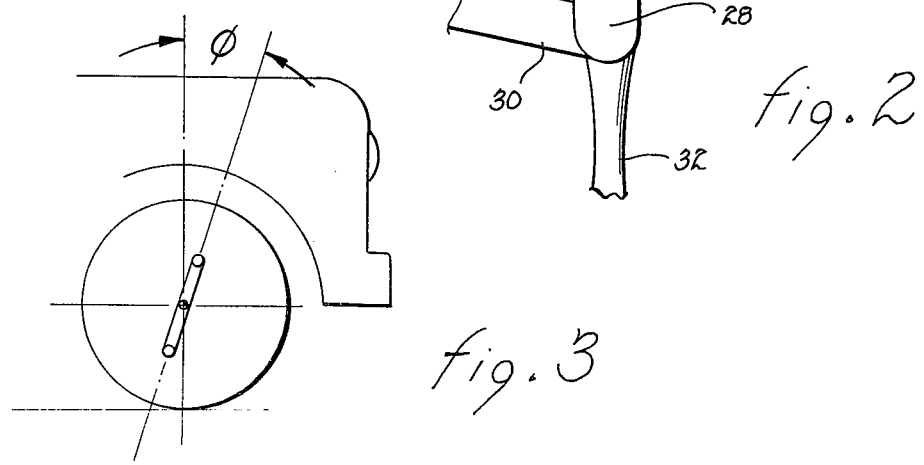
FIG. 3 illustrates a negative caster angle.

By appropriate manipulation of the control valve mechanism, hydraulic fluid may be channeled into and out of hydraluic lines 44, 46, 52 and 54 to bring about equal and opposite extension/contraction of plungers 38 and 40. Thereby, angular orientation of upper control arm 18 with respect to frame member 20 is under control of the driver while the vehicle is in motion. Such angular reorientation of the control arm will, as discussed above, result in a change in caster of the wheel mounted on spindle 32. Note the negative caster at an angle of theta ($\theta$) as shown in FIG. 3. Thereby, the driver of the vehicle can alter the caster of the wheel from positive caster on straight roads to negative caster when encountering curved roads and vice versa.

Figure 4:
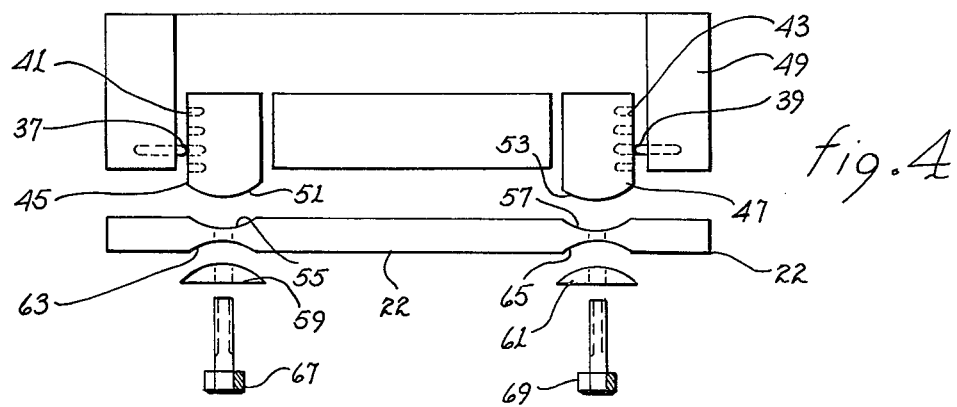
FIG. 4 illustrates a variant of the invention shown in FIG. 2.

A variant of the hydraulically operated apparatus shown in FIGS. 1 and 2 as illustrated in FIG. 4. Herein, a pair of pistons 45 and 47 are slidably mounted within a hydraulic unit 49. End surfaces 51 and 53 of these pistons are arced to mate with corresponding bearing surfaces 55 and 57 located upon pivot shaft 22. Rocker plates 59 and 61 are positioned in correspondingly arced depressions 63 and 65. Bolts 67 and 69 pass through rocker plate 59, 61, pivot shaft 22 and threadedly engaged pistons 51 and 53, respectively.

Upon extension/retraction of the pistons, pivotal movement to pivot arm 22 will be effected. The resulting angular reorientation between the pistons and the pivot shaft is readily accommodated by the mating arced surfaces between the pistons and the pivot arm. The hydraulic system for effecting opposite movement of pistons 45 and 47 may duplicate the system illustrated in FIG. 2 or it may be of some other configuration, provided only that opposed movement be effected upon command from the driver of the vehicle.

To render the system fail safe in the event of loss of hydraulic pressure, spring loaded hydraulically retracted pins 37, 39 may be disposed within unit 49 to mechanically lock each of the pistons to the unit at whatever position the pistons happen to be when hydraulic pressure is lost by engagement with one of cavities 41, 43. As an adjunct to this fail safe feature, the total movement of the pistons may be physically limited to such movement which will not exceed a predetermined pivotal movement of pivot shaft 22. Thereby, even upon loss of hydraulic pressure, the attached wheel will still be within the tolerances for caster for the vehicle. A similar fail safe system can be incorporated in the embodiment shown in FIGS. 1 and 2.

Figure 5:
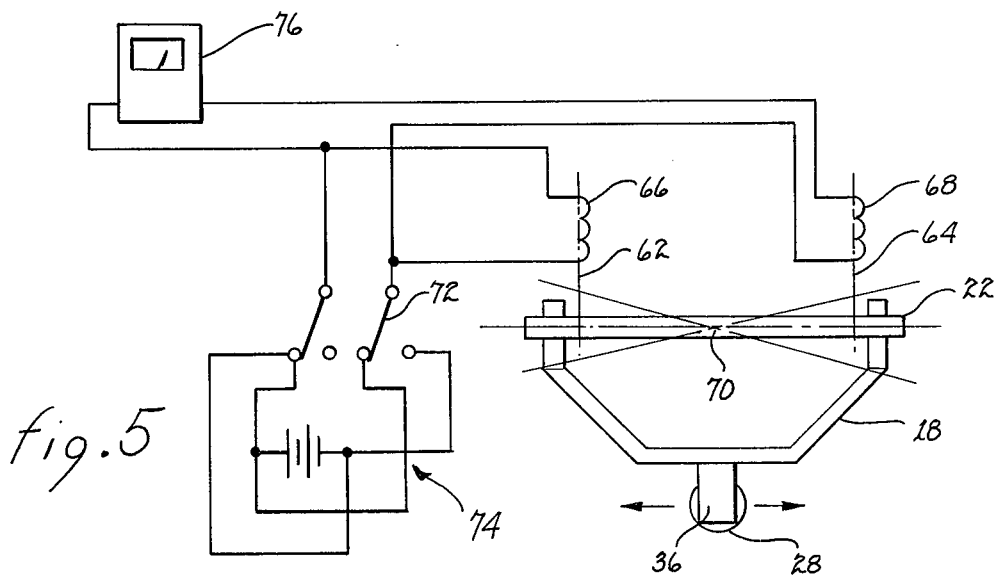
FIG. 5 illustrates a first variant.

FIG. 5 illustrates a variant of the present invention wherein electrical power is employed to actuate dual acting solenoids to effect pivotal movement of the upper control arm. Upper control arm 18 supports knuckle spindle 28 through upper ball joint 36. The upper control arm is pivotally mounted upon pivot shaft 22. Armatures 62 and 64 of solenoids 66 and 68 are mechanically secured to pivot shaft 22 to effect pivotal movement of the upper control arm about an imaginary pivot point 70.

It may be noted that pivot point 70 is maintained in a fixed lateral relationship with respect to the frame member. Thus, a change in caster angle can be effected without a change in caster of the attached wheel. A similar relationship exists with respect to the variants shown in FIGS. 1, 2, 5 and 6.

An electrical switch 72, actuatable by the driver of the vehicle while the vehicle is in motion, is actuated to supply power to solenoids 66 and 68 to switch armatures 62 and 64 from a first position to a second position.

Figure 6:
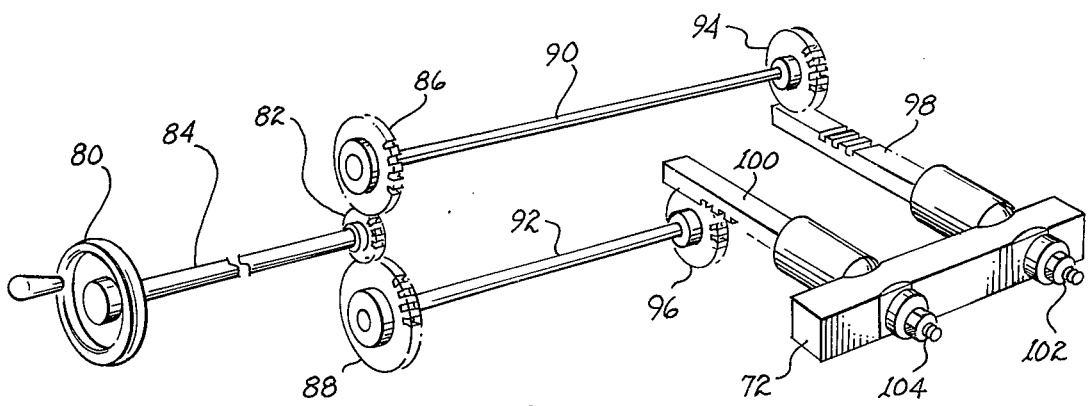
FIG. 6 illustrates a second variant.

Such armature actuation results in pivotal movement of upper control arm 18, represented by the dashed lines passing through pivot point 70. A meter 76 or other indicator may be employed to provide an indication of the angular position of upper control arm 18 and hence caster of the attached wheel. A yet further variant of the present invention is illustrated in FIG. 6. Herein, a manually operated wheel 80 is accessibly located to the driver of the vehicle. On rotation of the wheel, a gear 82 attached to the wheel through shaft 84 meshes with and drives gears 86 and 88. Gears 86 and 88, acting through shafts 90 and 92, respectively, drive pinion gears 94 and 96 cooperating with racks 98 and 100. Threaded ends 102 and 104 of racks 98 and 100, respectively, are bolted to pivot shaft 22, which shaft is ultimately connected to an upper control arm (not shown).

By inspection of the variant shown in FIG. 6, it will become evident that on rotation of wheel 80 in a first direction, one of the racks will retract while the other one will extend. Such retraction and extension results in pivotal movement of pivot shaft 22 and produces a commensurate pivotal movement of the attached upper control arm to effect a change in caster of the attached wheel. It is to be understood that the rack and pinion apparatus shown in FIG. 6 may be replaced by other mechanical means, such as a worm gear system, etc.

Moreover, it is to be understood that other sources of power such as a source of vacuum could also be used to effect pivotal movement of the upper control arm.

To ensure that loss of control of the vehicle will not result because of a malfunction of the embodiment shown in FIGS. 1 and 2 or either of the variants shown in FIG. 5 or 6, various control arm movement limiting mechanisms may be employed. In example, the electrical system of the variant shown in FIG. 5 may include an electrically operated pin for physically interlocking the armatures with a frame section should a power failure occur. To insure operation of such a system, the pins could be spring biased such that a loss of power would permit the springs to urge movement of the pins. Moreover, the maximum excursion available to the armatures could be limited to a value within the vehicle manufacturer's specified angular range between maximum positive caster and maximum negative caster. For the variant shown in FIG. 6, absolute translational movement of racks 98 and 100 can be physically limited. Alternatively, spring loaded pins, which are released only upon actuation of wheel 80, could be maintained in continuous engagement to lockingly secure the racks to the adjacent frame member whenever rotational movement of wheel 80 ceases.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. Apparatus employed in combination with each front wheel of a vehicle for adjusting the angle of caster of the front wheel while the vehicle is in motion; said apparatus comprising in combination:
    (a) a control arm for supporting in part the knuckle spindle for the wheel;
    (b) means for repositioning said control arm to define the caster of the wheel at any angle between a predetermined maximum angle of positive caster and a predetermined maximum angle of negative caster, said repositioning means being attached to said control arm as a part thereof during normal operation of the vehicle; and
    (c) means for actuating said repositioning means under control of the driver irrespective of whether the vehicle is stationary or in motion;
    whereby, the angle of caster may be varied to suit changing road and driving conditions.

2. The apparatus as set forth in claim 1 wherein said repositioning means comprises a hydraulic unit.

3. The apparatus as set forth in claim 2 wherein said hydraulic unit includes extendable and retractable plungers secured to said control arm for angularly reorienting said control arm about a vertical axis to change the caster angle.

4. The apparatus as set forth in claim 3 wherein said hydraulic unit includes a housing secured to the frame of the vehicle and said plungers translatably extend and retract from said housing in response to said actuating means.

5. The apparatus as set forth in claim 4 wherein said actuating means comprises a source of hydraulic fluid under pressure and a valve means for selectively introducing hydraulic fluid under pressure to said housing.

6. The apparatus as set forth in claim 3 including means for locking said plungers in place to effect a fail safe mode.

7. The apparatus as set forth in claim 1 wherein said repositioning unit comprises an electrical unit.

8. The apparatus as set forth in claim 7 wherein said electrical unit comprises a pair of oppositely acting solenoids having armatures secured to said control arm for angularly restricting said control arm about a vertical axis to change the caster angle.

9. The apparatus as set forth in claim 8 wherein said actuating means comprises an electrical switch for energizing said solenoids.

10. The apparatus as set forth in claim 7 including means for locking said repositioning means in place to effect a fail safe mode.

11. The apparatus as set forth in claim 1 wherein said repositioning unit includes a gear train.

12. The apparatus as set forth in claim 11 wherein said repositioning unit includes a pair of oppositely translatable elements secured to said control arm for angularly reorienting said control arm about a vertical axis to change the caster angle.

13. The apparatus as set forth in claim 12 wherein said actuating means includes means for operating said gear train.

14. The apparatus as set forth in claim 11 including means for locking said gear train in place to effect a fail safe mode.

* * * * *